United States Patent [19]
Hastings

[11] Patent Number: 5,193,836
[45] Date of Patent: Mar. 16, 1993

[54] INTERMODAL TRANSPORT
[76] Inventor: Thomas M. Hastings, 9708 Valaretta Dr., Gretna, Nebr. 68028
[21] Appl. No.: 561,124
[22] Filed: Aug. 1, 1990

Related U.S. Application Data
[63] Continuation-in-part of Ser. No. 421,837, Oct. 16, 1989, abandoned.
[51] Int. Cl.$^5$ .................. B60R 19/24; B60R 19/38
[52] U.S. Cl. ............................ 280/418.1; 280/400; 280/407.1; 280/656; 293/118; 293/119; 410/83
[58] Field of Search ............... 280/401, 404, 407.1, 280/408, DIG. 8, 418.1, 656, 400; 410/70, 71, 72, 75, 77, 78, 80–84; 294/81.2; 293/118, 119

[56] References Cited
U.S. PATENT DOCUMENTS

| | | | |
|---|---|---|---|
| 3,163,306 | 12/1964 | Bennett et al. | 280/DIG. 8 |
| 3,188,042 | 6/1965 | Watters | 410/83 |
| 3,521,845 | 7/1970 | Sweda et al. | 410/83 |
| 3,587,890 | 6/1971 | Hyland et al. | 280/DIG. 8 |
| 3,588,160 | 6/1971 | Reiner | 293/119 |
| 3,653,521 | 4/1972 | Bridge | 410/80 |
| 4,844,672 | 7/1989 | Yurgevich | 410/77 |

Primary Examiner—Mitchell J. Hill
Attorney, Agent, or Firm—George R. Nimmer

[57] ABSTRACT

Intermodal transport of the removably attached combination of an underlying drayable chassis with an immediately overlying cargo-carrying container having a forward-end and a rearward-end. In conventional fashion, the container adjacent its forward-end is removably attached to a frontal portion of the drayable chassis. Departing from the prior art, the cargo-carrying container, at a prescribed rearward-length separation from its rearward-end, is removably attached to a single set of transversely aligned plural chassis rear-lock stations. Thus, the container rearward-length extends unconventionally cantileverly rearwardly from and might overlie the container's rearmost attachment station to the underlying drayable chassis.

7 Claims, 3 Drawing Sheets

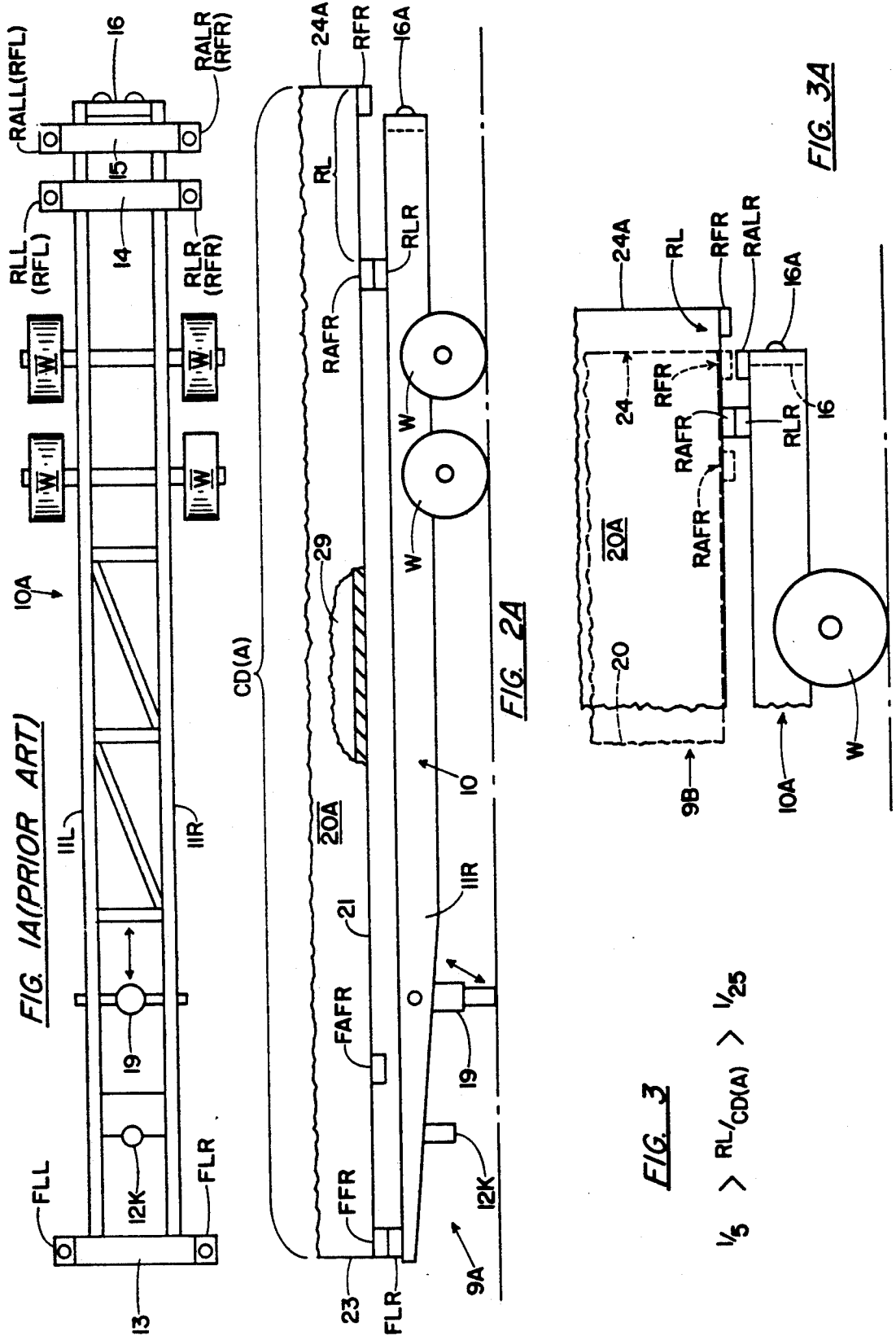

INTERMODAL TRANSPORT

This application is a continuation-in-part of applicant Hasting's co-pending patent application Ser. No. 07/421,837 filed Oct. 16, 1989, now abandoned.

BACKGROUND OF THE INVENTION

For "intermodal transport", sometimes referred to as roadway containerized shipping, a longitudinally extending cargo-carrying container is superimposed in immediately overlying condition with and removably attached to a drayable (e.g. tractor-drawn) wheeled chassis.

For the drayable chassis, typically there are transversely aligned front-lock stations and also transversely aligned rear-lock stations. The cargo-carrying container, along a horizontal flooring thereof, extends for a fixed nominal container-length from a forward-end to rearward-end thereof. At the two frontal/lower corners of the container, there are transversely aligned frontal-end fixtures (aka "castings") which are removably engageable with the drayable chassis front-locks (or equivalent means). And at the two rear/lower corners of the container, there are rearward-end fixtures (aka "castings") which are customarily removably engaged at the drayable chassis rear-lock stations.

For a relatively lengthy cargo-carrying container of some selected nominal container-length (e.g. 45-feet, 48-feet, 53-feet), it has been deemed axiomatic by prior art workers that the same nominal container-length must also exist between the front-lock means and the rear-lock stations of its underlying drayable chassis. Accordingly, toward the objective of accommodating more than one nominal container-length, prior art workers have provided drayable chassis of adjustable longitudinal length so that the distance between the front-lock means and the rear-lock stations will substantially equal the end-to-end container-length. However, such adjustable length type drayable chassis are excessively weighty, expensive, cumbersome, and difficult to adjustably alter. Moreover, in prior art, when attaching the rear-ward ends of the chassis and overlying container, it is impossible to accommodate different length containers on a single chassis having a fixed wheeled axle setting and maintain a constant setting between the chassis kingpin and wheeled axle.

OBJECTIVE OF THE INVENTION

It is accordingly the general objective of the present invention to overcome disadvantages and deficiencies of the prior art and provide a drayable chassis adapted to removably engage fortuitously encountered containers of various nominal container-lengths. It is a related objective to attain this general objective without reliance upon or usage of drayable chassis that is end-to-end dimensionally adjustable. It is another related objective to attain this general objective with substantial weight reductions for the drayable chassis. It is yet another related objective to attain this general objective with the assurance that the intermodal transport is readily dockable to facilitate container unloading while the chassis rear-end remains protected.

GENERAL STATEMENT OF THE INVENTION

With the above general objective in view, and together with the said related and other ancillary and specific objectives which will become more apparent as this description proceeds, the intermodal transport of the present invention is attained by superimposing a conventional cargo-carrying container of some nominal container-length upon a drayable chassis and conventionally removably inter-attaching forward portions of the container and chassis, then at some prescribed rearward-length from the container rearward-end (such as at the container rearward-secondary fixtures) effecting the rear-most attachment of the container to one of a plural sets of rear-lock stations the underlying chassis, whereby the container rearward-length extends contileverly rearwardly from the chassis and the container rearward-end is unattached to the chassis and might cantileverly overlie a rearward rear-lock station.

BRIEF DESCRIPTION OF THE DRAWING

In the drawing, wherein like characters refer to like parts in the several views, and in which:

FIG. 1A is a top plan view of another drayable chassis (10A) of the prior art;

FIG. 2A is an elevational view of an intermodal transport embodiment 9A of the present invention;

FIG. 3 schematically depicts a mathematical relationship utilized in intermodal transport embodiments 9A, 9B, and 9C of the present invention;

FIG. 3A is an elevational view, similar to FIG. 2A, showing the rearward portion of an intermodal transport embodiment 9B of the present invention;

DETAILED DESCRIPTION OF THE DRAWING

Figures 1, 2:
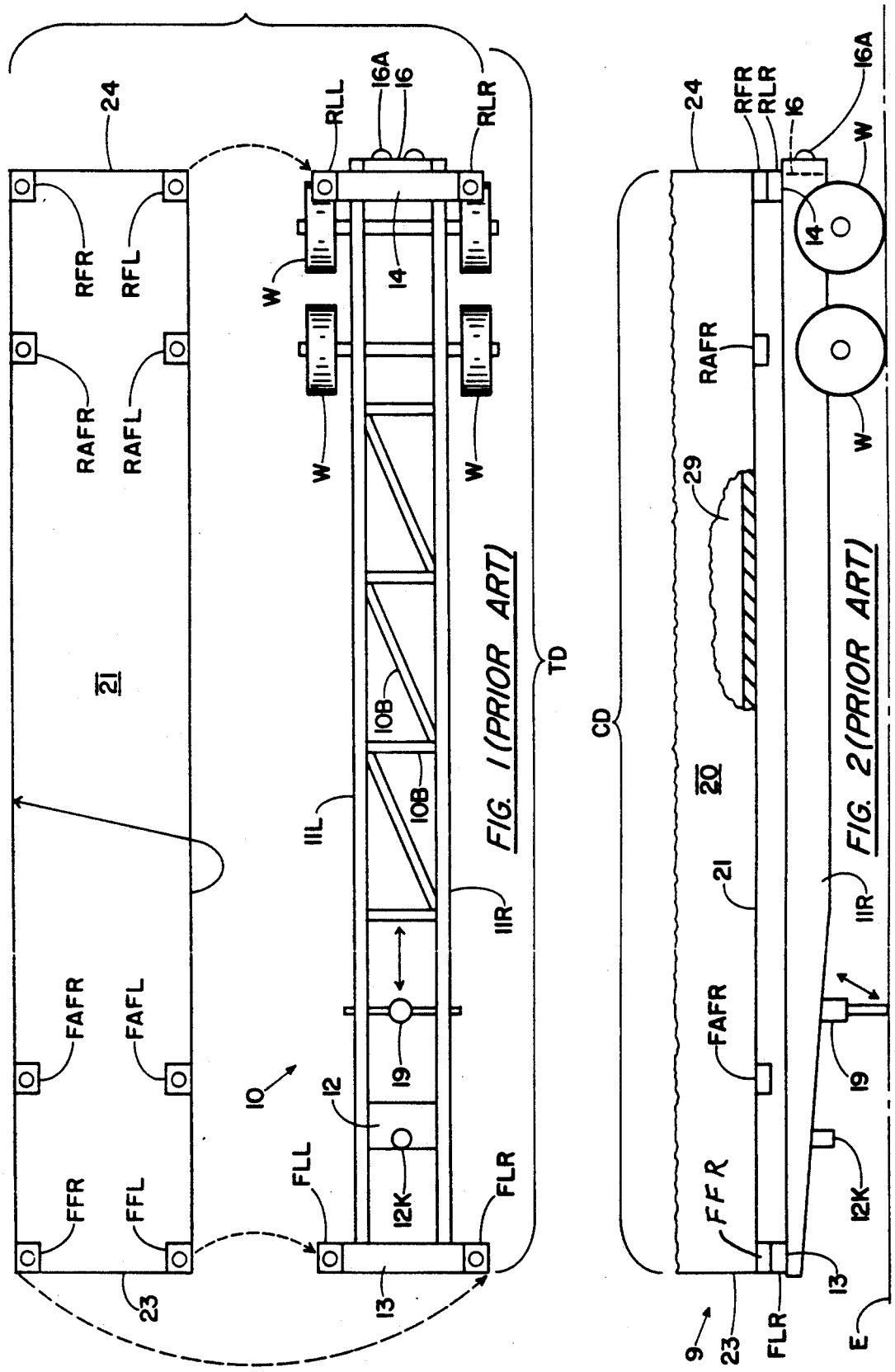
FIG. 1 is an exploded plan view of a prior art intermodal transport (9) comprising the combination of a drayable chassis (10) and removably attached cargo-carrying container (20)
FIG. 2 is an elevational view of the FIG. 1 intermodal transport showing the cargo-carrying container in conventional removably attached combination with the drayable chassis.

The prior art intermodal transport in a well known conventional form, and as alluded to as 9 in FIGS. 1 and 2, comprises the removably attached combination of a drayable chassis (e.g. roadway trailer 10) with a cargo-carrying hollow (29) container 20. In FIG. 1, the drayable chassis 10 is shown in top plan view; however (and as indicated by the phantom and J-shaped arrows) the cargo-carrying container 20 is shown in bottom plan view.

FIGS. 1 and 2 drayable chassis 10 extends directionally longitudinally and generally horizontally, and herein for a constant finite length ("TD" or 13-16) along parallel structural members 11L and 11R. Parallelism between members 11L and 11R is maintained by bracing means 10B and augmented by directionally transversely extending members (12, 13, 14, 16). Nearer to its front-end 13 than to its rear-end 16, there are drayage attachment means for coupling the drayable chassis to a tractor tow. Herein, such drayage attachment means comprises a kingpin 12K extending rigidly downwardly from the structural member 12. 19 refers to a frontal prop which, as indicated by double-headed arrow, is employed downwardly against substrate E whenever the chassis is not being towed. 16A refers to rearward tail lights. W refers to substrate engaging wheel means located at the chassis rearward portion. For effecting removable attachment to container forward-end fixtures (FFL, FFR), a forward portion (e.g. at 13) of chassis 10 might include transversely aligned and separated front locks (FLL, FLR). Such removable attachment between drayable chassis locks and cargo-carrying container fixtures is conventional (e.g. U.S. Pat. Nos. 3,486,787, 4,459,072, etc.). Similarly, adjacent chassis rear-end 16 (e.g. at bolster 14), there are transversely aligned and separated rear locks (RLL, RLR) which are adapted for removable attachment to container rearward-end fixtures (RFL, RFR).

Figure 4A:
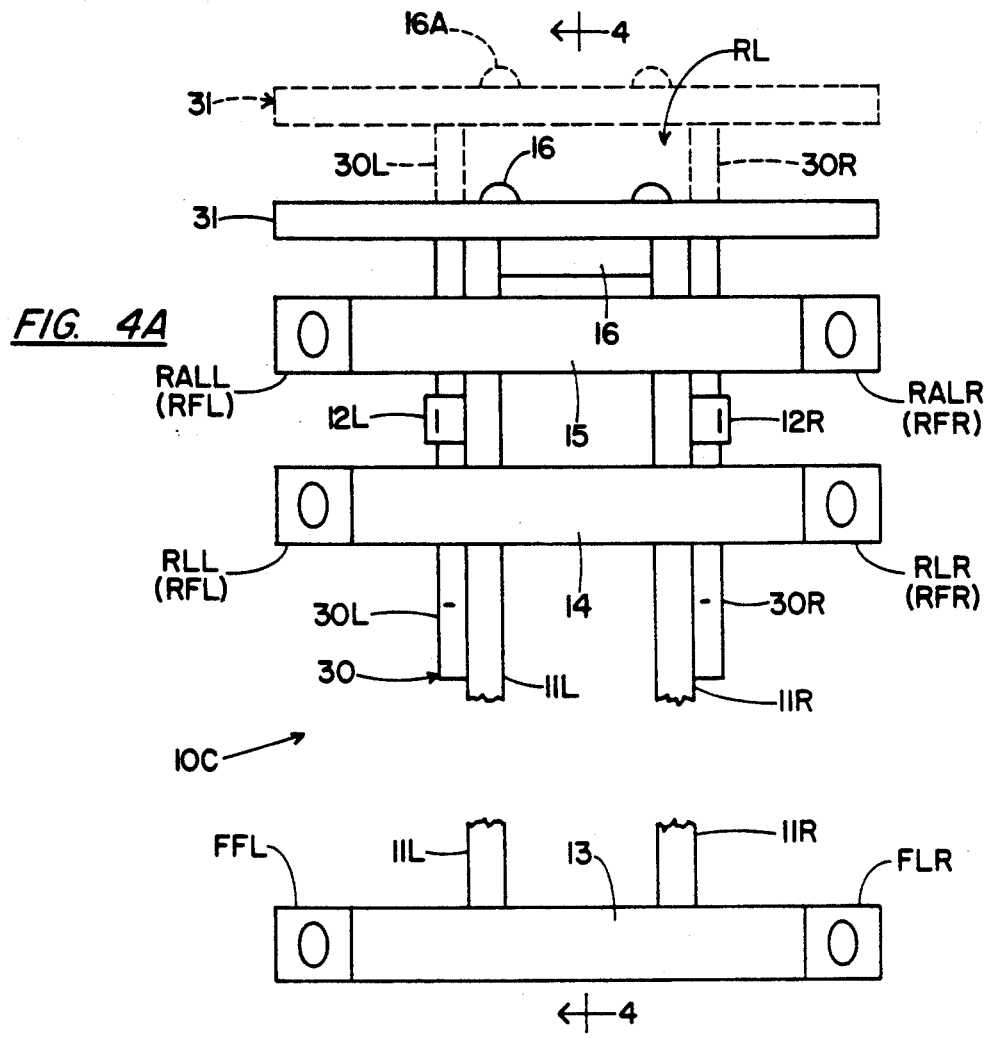
FIG. 4A is a top plan view showing a drayable chassis (10C) employed in intermodal transport embodiment 9C of the present invention.

Between its transversely extending upright ends 23 and 24, and along horizontal flooring 21, cargo-carrying container 20 extends directionally longitudinally for a constant container-length "CD". Such container at transversely aligned and separated locations of its forward-end 23 is provided with said forward-end fixtures (FFL, FFR). Analagously, such container at transversely aligned and separated locations of its rearward-end 24 is provided with said rearward-end fixtures (RFL, RFR). In addition to said forward-end and rearward-end fixtures, the container at flooring level 21 is also typically provided with two additional pairs of transversely aligned and separated analagous fixtures, denominatable as forward-secondary intermediate fixtures (FAFL, FAFR) and rearward-secondary intermediate fixtures (RAFL, RAFR). Distance separations between the forward-secondary and forward-end fixtures, and between the rearward-secondary and rearward-end fixtures, are typically substantially equal to each other. For example, for 48-feet and for 53-feet container-lengths, the distance separations are 4-feet and 6½-feet, respectively. In the prior art, r these secondary or intermediate fixtures are employed for attaching vertically stacked cargo-carrying containers but not (as advocated in ensuing FIGS. 2A, 3A, and 4A) for attaching a lengthy cargo-carrying container to an immediately underlying drayable chassis.

Another prior art drayable chassis 10A (e.g. as disclosed in U.S. Pat. No. 3,521,845) is depicted in FIG. 1A. Prior art chassis 10A differs from prior art chassis 10 in that there is an analagous second set (RALL, RALR) of transversely aligned rearward rear-lock stations, there being a small and fixed spacing between the first set (RLL, RLR) and the second set (RALL, RALR). As is clearly taught by U.S. Pat. No. 3,521,845, each of said two rear lock sets is always employed for attachment to the container rearward-end fixtures.

DETAILED DESCRIPTION OF THE DRAWING
(re the Present Invention)

Unlike the intermodal transports of the aforedescribed prior art, wherein a drayable chassis (10, 10A) is always affirmatively attached to the container rearward-end fixtures (RFL, RFR), in the present invention the trailer-like chassis is instead affirmatively attached to the rearward intermediate fixtures (RAFL, RAFR) of the container. Moreover, the container rearward-end fixtures (RFL, RFR) are located some cantileverly extending rearward-length "RL" from the drayable chassis rear locks. As indicated in FIG. 3, such container cantileverly extending rearward-length "RL", as compared to the container-length (23-24), represents a ratio within the range of substantially 1/25 to 1/5. The aforementioned differences are readily apparent by comparing FIG. 2A (that depicts intermodal transport embodiment 9A of this invention) with FIG. 2 (that depicts prior art intermodal transport 9). Among the several advantages of embodiment 9A, as compared to prior art embodiment 9, are:

(a) a drayable chassis of a shorter longitudinal length (i.e. drastically shorter than container-length 23-24A), and hence, of lighter and more economical weight, is attainable; and (b) maintained is the assurance that the container rear-end (24A) will be at the transport (9A) rearwardmost extremity where the container rear-end (24A) is readily "dockable" for ease in container unloading.

Intermodal transport 9B of FIG. 3A differs from said embodiment 9A of FIG. 2A in that the drayable chassis 10A of FIG. 1A, instead of the drayable chassis 10 of FIG. 1, is employed. Thus, it is possible with the same chassis 10A to alternatively:

(i) as indicated by phantom lines depicting a shorter length chassis 20, to attach the container rearward-end fixtures (RFL, RFR) and thereby provide a prior art intermodal transport (9); or alternatively (ii) as indicated by solid lines depicting a lengthier chassis 20A, to attach the container rearward intermediate fixtures (RAFL, RAFR) and thereby provide a cantileverly extending intermodal transport of the present invention.

Accordingly herein, said container cantileverly extending rearward-length "RL" might overlie a rearward set (e.g. RALL-RALR) of the chassis' longitudinally separated and transversely extending rear-lock stations (e.g. RLL-RLR, RALL-RALR).

Figure 4:
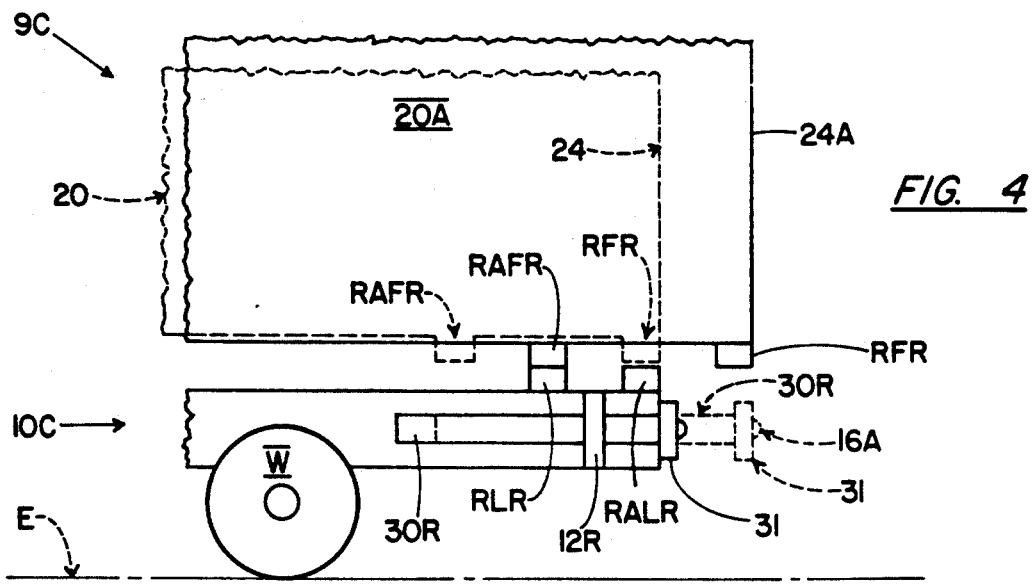
FIG. 4 is an elevational view, similar to FIGS. 2A and 3A, showing the rearward portion of an intermodal transport embodiment 9C of the present invention.

Drayable chassis embodiments 10A (of FIG. 1A) and 10C (of FIG. 4A) are alternatively employable to provide the type of intermodal transport suggested by FIG. 3A. Drayable chassis embodiment 10C differs from drayable chassis embodiment 10A in the further provision of a novel and utilitarian longitudinally adjustably associated lightbar accessory. A comparison of drawing FIGS. 1A and 4A reveals that accessory augmentation 30 comprises a pair of longitudinally extending horizontal arms 30L and 30R that are slidably associated along the chassis structural members 11L and 11R, respectively. In the latter regard, members 11L and 11R are provided with outwardly extending collars 12L and 12R, respectively. Such collars 12L and 12R maintain the respective accessory arms (30L, 30R) in horizontal orientation and longitudinally slidable alongside chassis structural members 11L and 11R. In addition to the said longitudinal horizontal arms 30L and 30R, slidably associated chassis accessory 30 comprises a directionally transversely extending horizontal endbar 31 that is attached to the rearward extremities of arms 30L and 30R and that carries tail lights 16A. Thus, and as indicated by phantom line positions in FIGS. 4 and 4A for accessory 30, such longitudinally adjustably associated accessory 30 makes it possible to appropriately position the tail lights 16A in substantial vertical alignment with the container rearward-end (24, 24A).

From the foregoing, the construction and operation of the intermodal transport concept will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

I claim:

1. For providing an intermodal transport combination of a drayable chassis in removably attached condition with a cargo-carrying container, and said intermodal transport combination comprising:
   (A) said drayable chassis from a front-end to a rearend extending directionally longitudinally and generally horizontally for a finite length, said chassis immediately forwardly of the rearend thereof being provided with at least two adjacent sets of longitudinally separated and directionally transversely extending rear-lock stations; and
   (B) said container having a forward-end, a rearward-end, and a substantially horizontal floor that, from said forward-end to said rearward-end, extends directionally longitudinally for a constant container-length, said container adjacent its forward-end being removably attached to the chassis adjacent the chassis front-end, said container rearward-end being located at least some rearward-length from and unattached to any set of the chassis rear-lock stations, and said container at transversely aligned rearward portions thereof and spaced substantially said rearward-length forwardly of the container rearward-end being provided with intermediate fixtures that are removably attached to a longitudinally forward set of said chassis rear-lock stations, whereby the container rearward-length extends cantileverly rearwardly from the transversely aligned intermediate fixtures thereof and overlies at least one set of said transversely extending rear-lock stations.

2. The transport combination of claim 1 wherein the chassis immediately forwardly of the rear-end thereof is provided with at least three sets of transversely extending rear-lock stations.

3. The intermodal transport combination of claim 1 wherein the said cantileverly extending rearward-length, as dimensionally compared to said container-length, represents a ratio within the range of substantially one-twenty-fifth to one-fifth.

4. The transport combination of claim 3 wherein at least a portion of the cantileverly extending rearward-length is located rearwardly of the chassis rear-end, whereby the container rearward-end provides the intermodal transport rearward extremity.

5. The intermodal transport combination of claim 4 wherein the chassis is rearwardly provided with a directionally transversely extending and generally horizontal lightbar accessory that is directionally longitudinally associated with a rearward portion of the chassis, said lightbar accessory being directionally longitudinally movable, whereby said lightbar is adjustably positionable to lie in substantial vertical alignment with the rearward-end extremity of said container cantileverly extending rearward-length.

6. The transport combination of claim 3 wherein the said container at transversely aligned rearward-end locations thereof is provided with rearward-end fixtures that are located rearward of and unattached to any of said chassis rear-lock stations.

7. For providing an intermodal transport combination of a drayable chassis in removably attached condition with an overlying cargo-carrying container, said intermodal transport combination comprising:
   (A) said drayable chassis from a front-end to a rear-end extending directionally longitudinally and generally horizontally for a finite-length, said chassis immediately forwardly of the rear-end thereof being provided with at least one set of directionally transversely extending rear-lock stations;
   (B) said container having a forward-end, a rearward-end, and a substantially horizontal floor that, from said forward-end to said rearward-end, extends directionally longitudinally for a constant container-length, said container adjacent its forward-end being removably attached to the chassis adjacent the chassis front-end, said container rearward-end being located at least some rearward-length from and unattached to any set of the chassis rear-lock stations, and said container at transversely aligned rearward portions thereof and spaced substantially said rearward-length forwardly of the container rearward-end being provided with intermediate fixtures that are removably attached to a single set of said chassis rear-lock stations, whereby the container rearward-length extends cantileverly rearwardly from the transversely aligned intermediate fixtures thereof; and
   (C) said chassis being rearwardly provided with a directionally transversely extending and generally horizontal lightbar accessory that is directionally longitudinally adjustably associated with a rearward portion of the chassis, whereby said lightbar accessory is adjustably positionable to lie in substantial vertical alignment with the rearward-end of said container cantileverly extending rearward-length.

* * * * *